United States Patent
Speller

(10) Patent No.: US 11,077,936 B2
(45) Date of Patent: Aug. 3, 2021

(54) FLUID DELIVERY DEVICE

(71) Applicant: Bell Helicopter Textron Inc., Fort Worth, TX (US)

(72) Inventor: Charles Speller, Flower Mound, TX (US)

(73) Assignee: Textron Innovations Inc., Providence, RI (US)

( * ) Notice: Subject to any disclaimer, the term of this patent is extended or adjusted under 35 U.S.C. 154(b) by 460 days.

(21) Appl. No.: 15/874,967

(22) Filed: Jan. 19, 2018

(65) Prior Publication Data

US 2019/0225328 A1 Jul. 25, 2019

(51) Int. Cl.
*B64C 27/12* (2006.01)
*F16H 57/04* (2010.01)

(52) U.S. Cl.
CPC ......... *B64C 27/12* (2013.01); *F16H 57/0435* (2013.01); *Y10T 137/87676* (2015.04)

(58) Field of Classification Search
CPC ................ B64C 27/12; F16H 57/0435; Y10T 137/87676
USPC .................................... 244/60; 137/605, 872
See application file for complete search history.

(56) References Cited

U.S. PATENT DOCUMENTS

| | | | | |
|---|---|---|---|---|
| 2,505,757 A | * | 5/1950 | Dunbar | F02K 7/06 137/512.1 |
| 3,286,728 A | * | 11/1966 | Stephenson | F16K 15/16 137/856 |
| 4,000,723 A | * | 1/1977 | Boyesen | F01L 3/205 123/73 AA |
| 5,147,333 A | * | 9/1992 | Raines | A61M 39/02 137/625.34 |
| 6,083,194 A | * | 7/2000 | Lopez | A61M 39/02 604/28 |
| 6,220,793 B1 | * | 4/2001 | Meyer | D01G 23/08 137/872 |
| 6,481,462 B2 | * | 11/2002 | Fillmore | A61F 5/4405 137/607 |
| 7,302,960 B2 | * | 12/2007 | Patzer | A61M 39/02 137/112 |
| 7,726,418 B2 | * | 6/2010 | Ayling | E21B 19/16 175/241 |
| 2004/0195538 A1 | * | 10/2004 | Raines | A61M 39/26 251/149.4 |
| 2010/0122746 A1 | * | 5/2010 | Lo | F16K 31/1221 137/605 |
| 2016/0363208 A1 | * | 12/2016 | Louis | F16N 7/40 |
| 2017/0138461 A1 | * | 5/2017 | Chory | F16H 57/0435 |
| 2017/0284535 A1 | * | 10/2017 | Ehinger | B64C 27/28 |

* cited by examiner

*Primary Examiner* — Christopher D Hutchens
(74) *Attorney, Agent, or Firm* — Lightfoot & Alford PLLC

(57) ABSTRACT

A fluid delivery device includes a body and a reed. The body has a primary inflow passage, a secondary inflow passage, and an outflow passage. The reed is disposed at least partially within the body. The reed is configured to move to a first position when a fluid flows from the primary inflow passage and move to a second position when the fluid flows from the secondary inflow passage.

20 Claims, 3 Drawing Sheets

FLUID DELIVERY DEVICE

TECHNICAL FIELD

This invention relates generally to a rotorcraft, and more particularly, to a fluid delivery device for rotorcraft gearboxes.

BACKGROUND

Rotorcraft drive systems can include various components that produce and transfer power. For example, engines and gearboxes are standard components. Such components generate heat and require lubrication. Excessive levels of heat can cause premature failure and create safety risks. Proper lubrication serves to reduce heat generation and assist in heat removal from moving components within gearboxes.

Typically, rotorcraft use a variety of primary lubrication systems to provide wear protection and heat transfer for moving components. Under normal operating conditions, primary lubrication systems deliver proper lubrication to moving components via a primary jet. However, primary lubrication systems can fail to result in excessive heat generation, wear, and failure of components, such as bearings or gears within a gearbox.

Rotorcraft are generally required to maintain manageable flight operations for selected durations of time if the primary lubrication system fails. One method used to satisfy the requirements of manageable flight during a lubrication system failure is to use a secondary, emergency lubrication system to operate when the primary lubrication system fails. This secondary lubrication system also includes at least one secondary jet. Having both a primary and a secondary jet increases the weight of a rotorcraft. Therefore, an improved fluid delivery device that can deliver lubricant from both a primary source and a secondary source is needed.

SUMMARY

Particular embodiments of the present disclosure may provide one or more technical advantages. A technical advantage of one embodiment may include the capability to deliver supplemental lubricant to a gearbox when the rotorcraft experiences a reduction in lubricant pressure. A technical advantage of one embodiment may include the capability to reduce the friction experienced by components of a gearbox when the rotorcraft experiences a reduction in lubricant pressure. A technical advantage of one embodiment may include the capability to increase the amount of time that a rotorcraft can operate with a reduced lubricant pressure. A technical advantage of one embodiment may include the reduction of weight of the rotorcraft.

Certain embodiments of the present disclosure may include some, all, or none of the above advantages. One or more other technical advantages may be readily apparent to those skilled in the art from the figures, descriptions, and claims included herein.

BRIEF DESCRIPTION OF THE DRAWINGS

To provide a more complete understanding of the present invention and the features and advantages thereof, reference is made to the following description taken in conjunction with the accompanying drawings, in which.

DETAILED DESCRIPTION OF THE DRAWINGS

Illustrative embodiments of the system of the present application are described below. In the interest of clarity, all features of an actual implementation may not be described in this specification. It will, of course, be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figure 1:
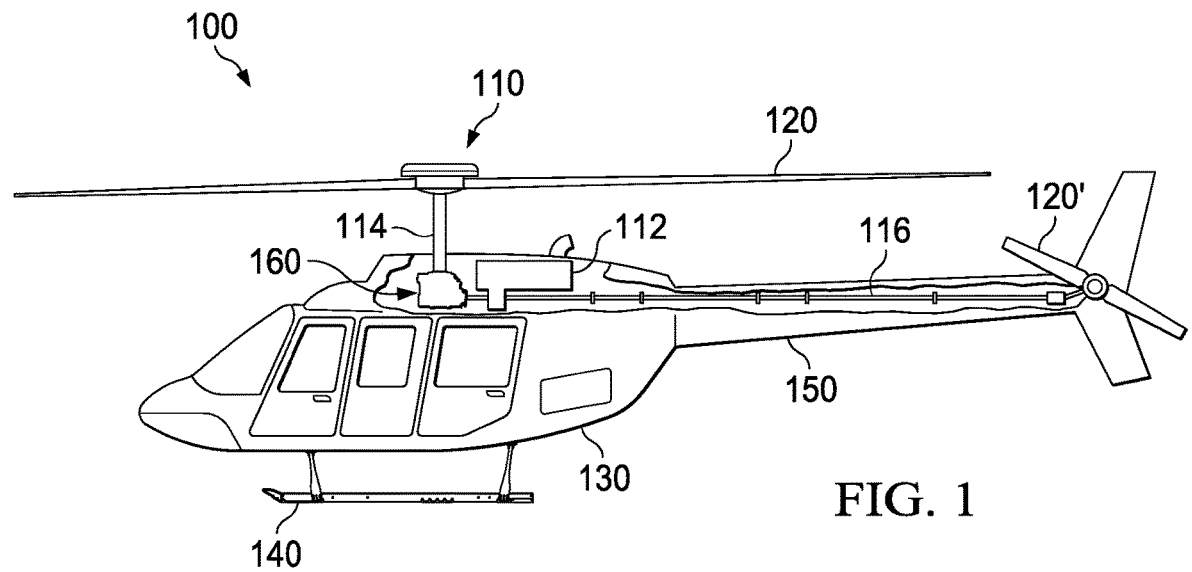
FIG. 1 shows a side view of a rotorcraft, according to one example embodiment.
Figure 2:
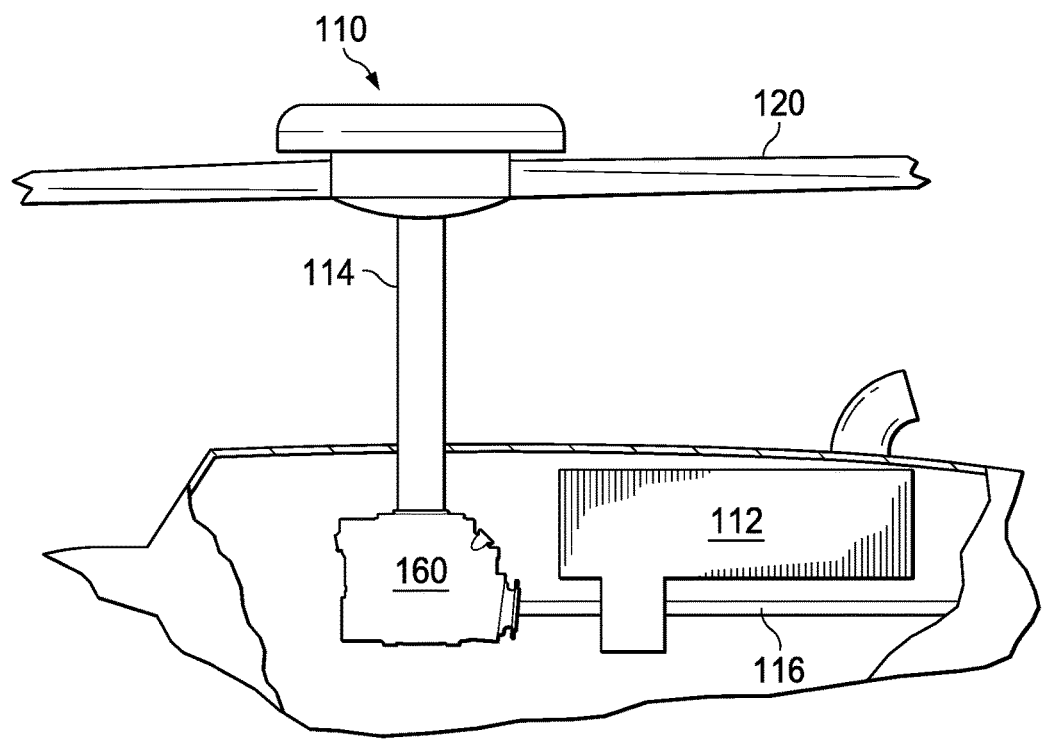
FIG. 2 shows a side view of a portion of a powertrain system, according to one example embodiment.

FIG. 1 shows a rotorcraft 100 according to one example embodiment. Rotorcraft 100 features powertrain system 110, main rotor blades 120, tail rotor blades 120', a fuselage 130, a landing gear 140, and an empennage 150. Powertrain system 110 may rotate blades 120 and/or blades 120'. FIG. 2 shows the powertrain system 110 of FIG. 1.

In the example of FIGS. 1 and 2, powertrain system 110 includes an engine 112, a gearbox 160, a rotor mast 114, and a tail rotor drive shaft 116. Engine 112 supplies torque to mast 114, via gearbox 160, for rotating of blades 120. Engine 112 also supplies torque to tail rotor drive shaft 116 for rotating blades 120'. In the examples of FIGS. 1 and 2, gearbox 160 is a main rotor transmission system. Teachings of certain embodiments recognize, however, that powertrain system 110 may include more or different gearboxes than gearbox 160 shown in FIG. 1.

Fuselage 130 represents the body of rotorcraft 100 and may be coupled to powertrain system 110 such that powertrain system 110 and blades 120 may move fuselage 130 through the air. Landing gear 140 supports rotorcraft 100 when rotorcraft 100 is landing and/or when rotorcraft 100 is at rest on the ground. Empennage 150 represents the tail section of the aircraft and features blades 120'. Powertrain system 110 and blades 120' may collectively provide thrust in the same direction as the rotation of blades 120 to counter the torque effect created by blades 120. It should be appreciated that teachings from rotorcraft 100 may apply to aircraft other than rotorcraft, such as airplanes, tilt rotors, unmanned aircraft, to name a few examples. In addition, teachings of certain embodiments relating to rotor systems described herein may apply to powertrain system 110 and/or other powertrain systems, including but not limited to non-rotorcraft powertrain systems.

A gearbox, such as gearbox 160, may transmit power from a power source (e.g., engine 112) to an object to be moved. A gearbox may convert speed and torque between the power source and the object to be moved. One example of a gearbox may include a gearbox that can be configured to reduce the speed of the rotational output of the engine.

A gearbox, such as gearbox 160, may include various gears and bearings. A gear is a rotating part having teeth that mesh with another toothed part to transmit torque. Gears in a gearbox may be used to provide speed and torque conversions. A bearing may include any of various machine elements that constrain the relative motion between two or more parts to only the desired motion. Bearings in a gearbox may perform tasks such as supporting a gear shaft.

Gears, bearings, and other mechanical components of a gearbox are subject to wear and heat generation due to contact with other components. These mechanical components may be lubricated to reduce friction and transfer heat away from the components. Lubrication is the process or technique employed to reduce wear of one or both surfaces in close proximity, and moving relative to each other, by interposing a substance, such as a lubricant, between the surfaces to help carry the load (pressure generated) between the opposing surfaces.

A lubricant is a substance introduced to reduce friction between moving surfaces. Examples of lubricants include oil, biolubricants derived from plants and animals, synthetic oils, solid lubricants, and aqueous lubricants. Example transmission oils for gearbox 160 may include oils meeting specifications MIL-PRF-23699 (5 cSt), DOD-L-7808 (3-4 cSt), DOD-PRF-85734 (5 cSt), and other oils in the 9 cSt to 10 cSt viscosity range.

Powertrain system 110 may include a primary lubrication system to provide lubricant to the mechanical components of a gearbox, such as gearbox 160. Under normal operating conditions, a primary pump may provide proper lubrication to gearbox 160, via one or more primary jets, and the lubricant pressure within gearbox 160 may be at a normal level, for example, fifty PSI (pounds per square inch).

However, in cases where the primary lubrication system does not provide proper lubrication to gearbox 160, or gearbox 160 experiences a loss of lubricant, a secondary lubrication system can provide lubricant to the mechanical components of gearbox 160. In traditional gearboxes, a secondary pump provides lubricant to a gearbox via one or more secondary jets.

Having a set of both primary and secondary jets may increase the weight of the aircraft and the complexity of the gearbox. Therefore, a fluid delivery device, such as fluid delivery device 300, that is capable of delivering lubricant from both a primary source and a secondary source can be beneficial.

Figure 3:
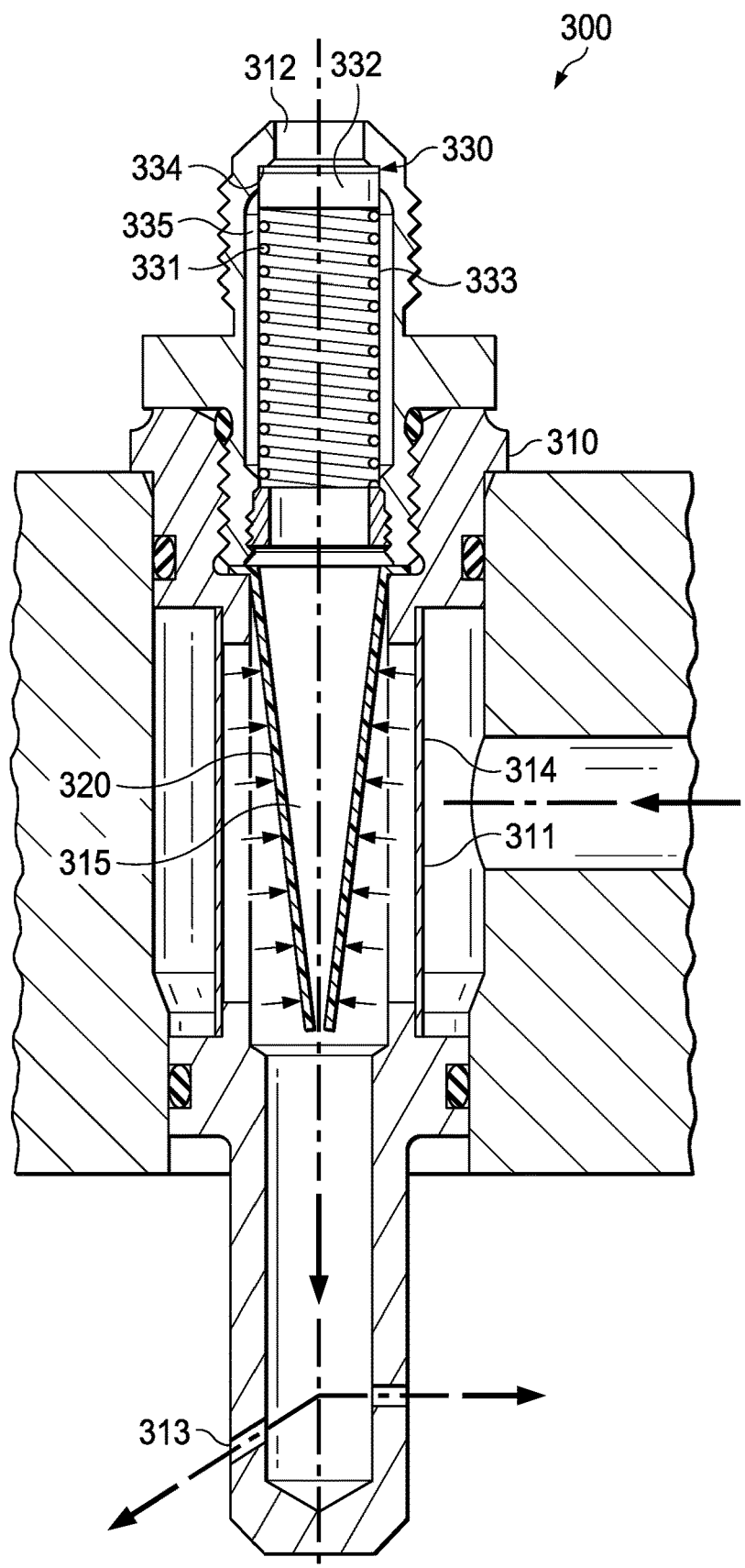
FIG. 3 shows a cross-section view of a fluid delivery device operating under normal operating conditions, according to one example embodiment.
Figure 4:
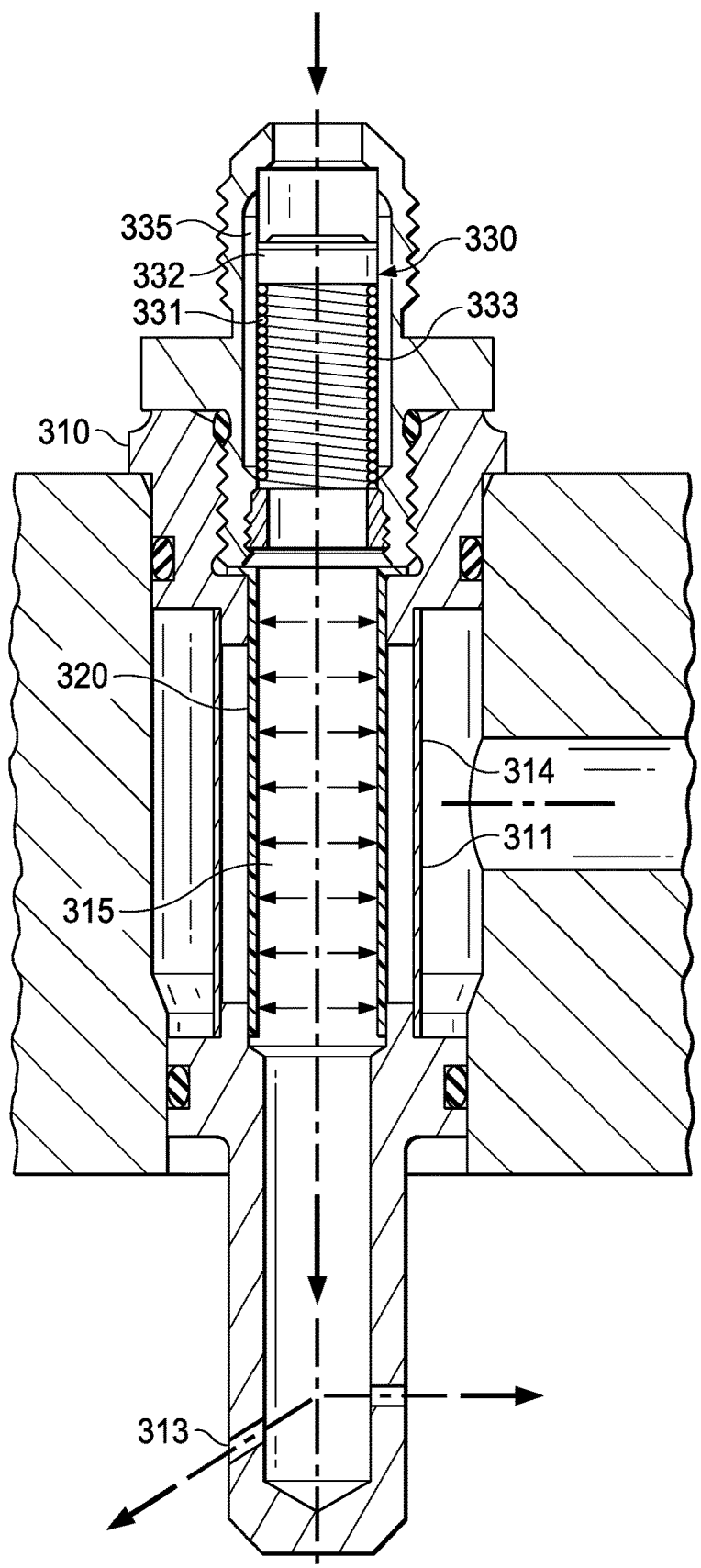
FIG. 4 shows a cross-section view of the fluid delivery device of FIG. 3 operating under emergency operating conditions, according to one example embodiment.

Now referring at least to FIG. 3 and FIG. 4, one example embodiment of fluid delivery device 300 is shown. Fluid delivery device 300 can be configured to deliver lubricant from both a primary source and a secondary source. Fluid delivery device 300 can include a body 310, a reed 320, and a valve 330.

In one example embodiment, body 310 is made from aluminum; however, it should be understood that body 310 could be made out of any acceptable material, such as polyether ether keton (PEEK) or another suitable metal such as stainless steel. Body 310 can be made from any suitable manufacturing method. For example, body 310 could be made from a casting, a forging, or bar stock, and then machined to its final dimensions. In another example, body 310 could be created by additive manufacturing.

Body 310 could include three or more orifices. In the example of FIG. 3 and FIG. 4, body 310 has a primary inflow passage 311, a secondary inflow passage 312, and two outflow passages 313. In another example, body 310 could include just one outflow passage 313; in yet another example, body 310 could include more than three outflow passages 313. Passages 311, 312, and 313 of body 310 could be any shape.

For example, the orifice that creates passages 311, 312, and/or 313 could be cylindrical or a hyper-rectangle.

Reed 320 of fluid delivery device 300 can represent a component that is configured to move from a first position to a second position, and vice-versa. In one example, reed 320 can be made from a metal such as stainless steel. In other examples, reed 320 can be made from aluminum or rubber.

In one example, reed 320 is configured to move to a first position when it experiences a fluid force coming primarily from the direction of primary inflow passage 311. Reed 320 can move to a second position when it experiences a minimal fluid force or an absence of a fluid force coming primarily from the direction of primary inflow passage 311. Reed 320 can also move to a second position when a fluid force coming from secondary inflow passage 312 overcomes the fluid force coming from primary inflow passage 311.

As seen best in FIG. 4, in one example embodiment, reed 320 has a first portion that is secured firmly against a portion of body 310, a second portion that is bent at approximately a ninety-degree angle, and a third portion that is configured to move from a first position to a second position. In effect, the bent, second portion of 320 can work as a hinge.

Other examples of how reed 320 can be configured to move from a first position to a second position are contemplated. For example, reed 320 can represent a flap that includes a spring hinge that provides an adequate closing force. In another example, reed 320 can represent a flexible rubber diaphragm that is placed on top of a mesh or perforated stationary material.

Valve 330 can represent any suitable device that is capable of controlling the passage of fluid through secondary inflow passage 312. For example, valve 330 can represent a variety of different types of check valves. Different types of check valves that could be used are ball check valves, poppet check valves, diaphragm check valves, disk check valves, etc. In other examples, valve 330 can represent a variety of different types of hydraulic valves.

In the example of FIG. 3 and FIG. 4, valve 330 includes a spring 331, a plug 332, a spring guide 333, a seat 334, and a cavity 335. Spring 331 can represent any device that can be configured to exert a spring force. Plug 332 can represent any device that can be configured to block or restrict a flow of fluid from an orifice, such as secondary inflow passage 312. Spring guide 333 can represent any device that can be configured to contain spring 331 within a certain space; spring guide 333 can include perforations that allow lubricant to flow from the areas within spring 331 to the areas outside of spring 331. Cavity 335 can represent a space within valve 330 that can be of any shape; cavity 335 can be formed by hogging out an aperture from the body of valve 330.

FIG. 3 shows a cross-section view of fluid delivery device 300 operating under normal operating conditions. Under normal operating conditions, a primary pump may provide lubricant to the mechanical components of a gearbox, such as gearbox 160, via fluid delivery device 300. Under normal operating conditions, lubricant can flow from the primary pump to the primary inflow passage 311, and then through screen 314. Because the lubricant is pressurized, the pressure of the lubricant can force reed 320 to its first position, allowing the lubricant to flow from the primary inflow passage towards and out through outflow passage 313.

Under normal operating conditions, a secondary pump may also be connected to secondary inflow passage 312 of fluid delivery device 300, via one or more tubes. However, during normal operating conditions, lubricant from the secondary pump may not be needed to lubricate the mechanical components of the gearbox. Therefore, pressurized lubricant may not be provided by a secondary pump to secondary inflow passage 312 of fluid delivery device 300. Because pressurized lubricant is not provided to secondary inflow passage 312 of fluid delivery device 300, the spring force of spring 331 is sufficient to press plug 332 against the seat 334 of valve 330 and prevent any backflow of lubricant.

FIG. 4 shows a cross-section view of fluid delivery device 300 operating under emergency operating conditions. Under emergency operating conditions, such as during a loss of lubrication event, a primary pump may not provide sufficient lubricant to the mechanical components of a gearbox, such as gearbox 160. Therefore, a secondary pump may be activated to provide supplemental lubricant to the mechanical components of a gearbox, such as gearbox 160.

When the secondary pump is activated, pressurized lubricant flows from the secondary pump towards secondary inflow passage 312. The pressurized lubricant can force plug 332 of valve 330 downwards, allowing lubricant to flow within the cavity 335 of valve 330. From cavity 335 of valve 330, pressurized lubricant can flow to cavity 315 of body 310. The pressurized lubricant that is within cavity 315 of body 310 can push reed 320 outwards to its second position, preventing the lubricant from flowing out of primary inflow passage. Instead of flowing out of primary inflow passage, lubricant flows from cavity 315 towards and out of one or more outflow passages 313 to lubricate one or more moving components of the gearbox.

Modifications, additions, or omissions may be made to the systems and apparatuses described herein without departing from the scope of the invention. The components of the systems and apparatuses may be integrated or separated. Moreover, the operations of the systems and apparatuses may be performed by more, fewer, or other components. The methods may include more, fewer, or other steps. Additionally, steps may be performed in any suitable order.

Although several embodiments have been illustrated and described in detail, it will be recognized that substitutions and alterations are possible without departing from the spirit and scope of the present invention, as defined by the appended claims.

To aid the Patent Office, and any readers of any patent issued on this application in interpreting the claims appended hereto, applicants wish to note that they do not intend any of the appended claims to invoke paragraph 6 of 35 U.S.C. § 112 as it exists on the date of filing hereof unless the words "means for" or "step for" are explicitly used in the particular claim.

What is claimed is:

1. A fluid delivery device, comprising:
a body comprising:
    a primary inflow passage;
    a secondary inflow passage; and
    an outflow passage; and
a reed disposed at least partially within the body, wherein the reed is configured to:
    move to a first position when a fluid flows from the primary inflow passage; and
    move to a second position when the fluid flows from the secondary inflow passage; and
    a secondary reed disposed at least partially within the body, wherein the reed and the secondary reed are configured to selectively move closer toward a center of a cavity when the fluid flows from the primary inflow passage.

2. The fluid delivery device of claim 1, further comprising a valve that is disposed at least partially within the body.

3. The fluid delivery device of claim 2, wherein the valve comprises a spring and a plug, the spring being configured to exert a force on the plug in a direction substantially towards the secondary inflow passage.

4. The fluid delivery device of claim 1, wherein the fluid is a lubricant.

5. The fluid delivery device of claim 1, wherein the reed comprises rubber.

6. The fluid delivery device of claim 1, wherein the reed comprises stainless steel.

7. The fluid delivery device of claim 6, wherein the reed comprises a first portion that is secured to the body and a third portion that is configured to:
    move to the first position when the fluid flows from the primary inflow passage; and
    move to the second position when the fluid flows from the secondary inflow passage.

8. The fluid delivery device of claim 1, wherein the fluid is prevented from flowing out of primary inflow passage when the reed is in the second position.

9. The fluid delivery device of claim 1, wherein when fluid flows from the primary inflow passage, fluid does not flow from the secondary inflow passage.

10. The fluid delivery device of claim 1, wherein a spring force acts on the reed in a direction substantially towards the second position.

11. A rotorcraft comprising:
a fuselage; and
a powertrain coupled to the fuselage, the powertrain comprising:
    an engine; and
    a gearbox, the gearbox comprising:
        a fluid delivery device comprising:
            a body comprising:
                a primary inflow passage;
                a secondary inflow passage; and
                an outflow passage; and
            a reed disposed at least partially within the body, wherein the reed is configured to:
                move to a first position when a fluid flows from the primary inflow passage; and
                move to a second position when the fluid flows from the secondary inflow passage; and
                a secondary reed disposed at least partially within the body, wherein the reed and the secondary reed are configured to selectively move toward a center of a cavity when the fluid flows from the primary inflow passage.

12. The rotorcraft of claim 11, the fluid delivery device further comprising a valve that is disposed at least partially within the body.

13. The rotorcraft of claim 12, wherein the valve comprises a spring and a plug, the spring being configured to exert a force on the plug in a direction substantially towards the secondary inflow passage.

14. The rotorcraft of claim 11, wherein the fluid is a lubricant.

15. The rotorcraft of claim 11, wherein the reed comprises rubber.

16. The rotorcraft of claim 11, wherein the reed comprises stainless steel.

17. The rotorcraft of claim 16, wherein the reed comprises a first portion that is secured to the body and a third portion that is configured to:
   move to the first position when the fluid flows from the primary inflow passage; and
   move to the second position when the fluid flows from the secondary inflow passage.

18. The rotorcraft of claim 11, wherein the fluid is prevented from flowing out of primary inflow passage when the reed is in the second position.

19. The rotorcraft of claim 11, wherein when fluid flows from the primary inflow passage, fluid does not flow from the secondary inflow passage.

20. The rotorcraft of claim 11, wherein a spring force acts on the reed in a direction substantially towards the second position.

* * * * *